US005781276A

United States Patent [19]

Zahn et al.

[11] Patent Number: 5,781,276

[45] Date of Patent: Jul. 14, 1998

[54] PRINTING OF COLOR FILM

[75] Inventors: Wolfgang Zahn, Munich; Manfred Fuersich, Taufkirchen; Klaus-Peter Hartmann, Schondorf, all of Germany

[73] Assignee: Agfa-Gevaert AG, Leverkusen, Germany

[21] Appl. No.: 799,131

[22] Filed: Feb. 13, 1997

Related U.S. Application Data

[63] Continuation-in-part of Ser. No. 430,151, Apr. 26, 1995, abandoned, which is a continuation of Ser. No. 72,509, Jun. 4, 1993.

[30] Foreign Application Priority Data

Jul. 27, 1992 [DE] Germany ............................ 42 25 059
Sep. 15, 1992 [DE] Germany ............................ 42 30 842

[51] Int. Cl.$^{6}$ .............................................. G03B 27/32

[52] U.S. Cl. ............................... 355/41; 355/35; 355/40

[58] Field of Search ................................ 355/35, 40, 41

[56] References Cited

U.S. PATENT DOCUMENTS 5,461,457 10/1995 Nakamura ............................ 355/41 X
5,629,752 5/1997 Kinjo ...................................... 355/35

*Primary Examiner*—Daniel P. Malley
*Attorney, Agent, or Firm*—Darby & Darby

[57] ABSTRACT

An exposure of a color film is scanned at a multiplicity of points in each of the primary colors. The color compositions of the points are evaluated to identify color compositions characteristic of skin tones, and a color space is created based on these color compositions. Scanned points whose color compositions lie in the color space undergo an examination to ascertain whether or not they actually represent skin. The examination is concerned primarily with the positions of such scanned points within the exposure and secondarily with density differences between the points and specified zones of the exposure, density differences between adjacent points, and the nature of any groups formed by the points, only those scanned points which actually represent skin are considered when calculating the amount of copy light for the exposure in each primary color.

21 Claims, 4 Drawing Sheets

PRINTING OF COLOR FILM

CROSS-REFERENCE TO RELATED APPLICATION

This application is a continuation-in-part of application Ser. No. 08/430,151 filed Apr. 26, 1995, abandoned, which, in turn, is a continuation of application Ser. No. 08/072,509 filed Jun. 4, 1993.

BACKGROUND OF THE INVENTION

The invention relates generally to the reproduction of a color image.

More particularly, the invention relates to a method of determining the amounts of copy light for the copying of a color image on color copy material.

In order to determine the amounts of copy light, the image is photoelectrically scanned at a multiplicity of points in each of the three primary colors red, green and blue. A color space or color solid is generated from those points having a color composition characteristic of skin or flesh tones. The amounts of copy light are then calculated based on the color space.

A method of this type is disclosed, for example, in U.S. Pat. No. 4,279,502. In order to detect portions of an image which can significantly affect reproduction of the image, the image-bearing area of a negative is checked for regions having a density significantly greater than the average density of the image-bearing area. In the event that such regions are present and are red (this is the case, for instance, in flash photographs having faces or skin tones), the total amount of copy light is selected in such a manner that, in the copy, the corresponding portions of the image are distinctly visible against the fog. This density correction for satisfactory reproduction of skin tones depends upon reliable detection of portions of an image having such tones.

German patent no. 26 28 090 teaches a method of exposure control. Here a color space is derived from a reference skin color and contains density combinations characteristic of the color of skin. Only density combinations inside the color space are used in the determination of the amounts of copy light.

For a series of photographs, this method leads to unsatisfactory results. There are two main reasons for this as follows:

First, the resolution of the measuring device is usually limited and the background is measured along with the skin zone at the boundary of the skin zone. The composite boundary regions have a relatively great influence, particularly when the skin zones are relatively small. They yield incorrect a densities which can greatly affect the copying results.

Second, due to the large variations in film type, exposure conditions and characteristics of the photographed subjects, the color space for identifying the skin zones must have a certain minimum size. It is thus possible that, for a given negative, points in the color space representing other than skin zones will be incorrectly identified as being associated with such zones. These points can result in incorrect copy densities when the corresponding negative densities differ significantly from the negative densities of skin zones.

SUMMARY OF THE INVENTION

It is an object of the invention to provide a method which enables better reproduction of skin zones to be achieved.

Another object of the invention is to provide an exposure control method which makes it possible to more reliably identify points representing skin zones.

The preceding objects as well as others which will become apparent as the description proceeds, are achieved by the invention.

The invention resides in a method of making a copy or print of an image-bearing area of a color master, e.g., a length of film containing a series of exposures or negatives. The image-bearing area has at least one zone representing skin, and the method comprises the steps of scanning the image-bearing area at a plurality of points in each of a plurality of colors; evaluating the color compositions of the scanned points to identify selected points of the image-bearing area having predetermined color compositions characteristic of skin or flesh tones; determining positional relationships between different ones of the characteristic points of the image-bearing area; accepting one characteristic point of the image-bearing area as a skin point actually representing skin only when such characteristic point, and at least one additional characteristic point, of the image-bearing area are adjacent one another; calculating an amount of copy light for the image-bearing area using data for the skin point; and making a copy of the image-bearing area on copy material using the calculated amount of copy light.

The scanning step is preferably performed photoelectrically. The image-bearing area may be scanned in the three primary colors red, green and blue.

The step of determining positional relationships can involve individually comparing the position of each of a first plurality of the characteristic points with the respective positions of each of a second plurality of the characteristic points.

In one embodiment of the method, predetermined ones of the characteristic points are accepted as skin points actually representing skin when the predetermined characteristic points form a group such that each point of the group has a color composition characteristic of a skin tone and is adjacent at least one other point of the group.

The image-bearing area may have a border and another embodiment of the method provides for a predetermined one of the characteristic points to be accepted as a skin point actually representing skin when this predetermined characteristic point is spaced from the border.

The image-bearing area can include an additional zone which adjoins the skin zone and represents a white item such as, for instance, a brightly illuminated white article of clothing, having a predetermined density. According to a further embodiment of the method, a predetermined one of the characteristic points is here accepted as a skin point actually representing skin when the predetermined characteristic point has a density which is about 0.4 to about 0.6 density steps below said predetermined density.

The image-bearing area may further include a zone which represents an illuminated background, e.g., a self-luminous background, having a preselected density. This background can extend into the image-bearing area from the border of the area. In accordance with still another embodiment of the method, a predetermined one of the characteristic points is accepted as a skin point actually representing skin when the predetermined characteristic point has a density of up to about 0.8 density steps below the preselected density.

The image-bearing area can also have a non-skin zone which represents other than skin and has a common boundary with the skin zone. The skin zone may include a first characteristic point which lies in the region of the boundary and a second characteristic point which lies on a side of the first characteristic point remote from the boundary. The method can then further comprise the steps of assigning a first value to the first characteristic point; assigning a second value to the second characteristic point; assigning a third value to a point of the non-skin zone; and adjusting the first value on the basis of the second and third values. The adjusting step can involve one or more subtractions using the second and third values.

In an additional embodiment of the method, predetermined ones of the characteristic points are accepted as skin points actually representing skin when the predetermined points form a two-dimensional group of adjacent points and the number of points along two substantially orthogonal directions is at least approximately the same.

Yet another embodiment of the method provides for predetermined ones of the characteristic points to be accepted as skin points actually representing skin when the predetermined characteristic points are adjacent one another and have a density difference greater than zero. The density difference preferably lies in the range of about 0.2 to about 0.5.

It is possible that predetermined ones of the characteristic points may form a group of adjacent points characteristic of an anatomical feature, e.g., a face. In such an event, the points of the group are accepted as skin points actually representing skin when the master includes a second group similar to the first group. The second group can be located in a second image-bearing area of the master.

The points of the first group may have a first average density while the points of the second group have a second average density. The points of the first group are accepted as skin points actually representing skin when the difference between the first and second average densities is less than a predetermined value.

As one criterion for deciding whether a given characteristic point is a point actually representing skin, the invention thus takes into consideration the location of the characteristic point within the respective image-bearing area. This makes it possible to compare neighboring points so as to determine whether they belong to an extended skin zone. Since the density ratios for the three primary colors are largely identical for all points of a skin zone, adjacent points with the same density ratios have a much higher probability of belonging to a skin zone.

A further embodiment of the invention employs one or more density differences to establish whether or not a characteristic point actually represents skin. To this end, the location of a characteristic point relative to the border of an image-bearing area, or to a zone representing very bright and white articles of clothing, or to a zone representing sky, is examined.

An additional embodiment of the invention involves a determination of whether a group of characteristic points corresponds to a skin zone. Criteria used here include height-to-width ratio, minimum number of points, and density variations within the group.

The novel features which are considered as characteristic of the invention are set forth in particular in the appended claims. The improved printing method itself, however, will be best understood upon perusal of the following detailed description of certain presently preferred embodiments when read in conjunction with the accompanying drawings.

DESCRIPTION OF THE PREFERRED EMBODIMENTS

Figure 1:
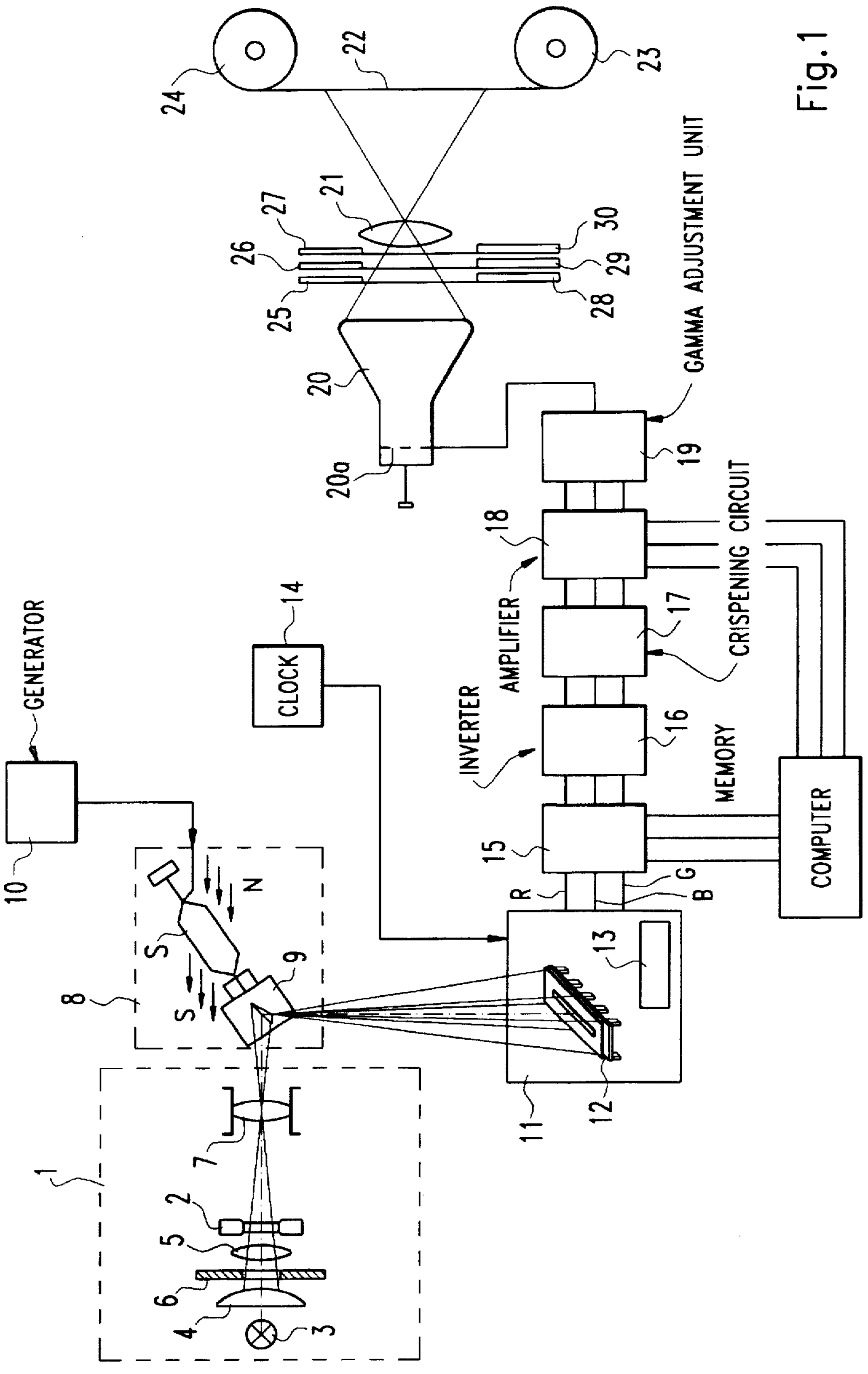
FIG. 1 shows a copying apparatus which can be used to carry out a method in accordance with the invention.

FIG. 1 shows an apparatus which serves to reproduce image-bearing areas of a color master 2 on color copy material 22. The color master 2 can be a length of color film having a series of image-bearing areas or exposures. The copy material 22, e.g., a strip of photographic paper, is intermittently unwound from a supply reel 23 and intermittently collected by a take upreel 24.

The apparatus includes a support or platform 1 which holds the master 2, a radiation source 3 and two condenser lenses 4, 5 which flank an adjustable diaphragm 6 between the radiation source 3 and the master 2. The platform 1 further holds an objective lens 7 which is disposed between the master 2 and a photoelectric scanning unit in the form of a swing reflector system 8 having a loop oscillator S and a pivotable reflector 9. The loop oscillator S is periodically driven by a generator 10. The scanning unit 8 is designed to photoelectrically scan the image-bearing areas of the master 2 line-by-line and point-by-point in each of the three primary colors red, green and blue.

The reflector 9 serves to deflect radiation issuing from the source 3 and passing through the master 2 towards an array 12 of photodiodes. The array 12 constitutes part of a charge-coupled device or CCD 11. The CCD 11 also comprises a shift register 13 which is connected with a pulse generator or clock 14.

The CCD 11 has an output R for red signals, an output G for green signals, and an output B for blue signals. The outputs R,G,B are connected to a memory 15 serving to store the red, green and blue signals which are generated during scanning of the master 2. When the apparatus of FIG. 1 is used to process a positive master 2, an inverter 16 is provided downstream of the memory 15 as considered in the direction of travel of the signals issuing from the CCD 11. The memory 15 has first outputs which are then connected to the inverter 16. The inverter 16 functions to invert each of the red, green and blue signals so that the outputs of the inverter 16, which are connected to a crispening circuit 17, transmit sequences of negative signals. The inverter 16 can be omitted when the apparatus of FIG. 1 is used to process a negative master 2 and, in this case, the first outputs of the memory 15 are connected to the crispening circuit 17.

The crispening circuit 17 steepens the flanks of the red, green and blue signals delivered thereto. To this end, the crispening circuit 17 operates on each input signal to generate a correction signal which is added to the respective output signal of the crispening circuit 17. The purpose of the crispening circuit 17 is to enhance the borderlines of the master 2.

The outputs of the crispening circuit 17 are connected to an amplifier 18 whose outputs are, in turn, connected to a gamma adjustment unit 19. The gamma adjustment unit 19 has an output which is connected to a cathode ray tube or CRT 20, and the gamma adjustment unit 19 serves to linearize the grey value of the CRT 20.

The memory 15 has second outputs which are connected to a computer 31. The computer 31 functions to identify those points of the master 2 which actually represent skin or flesh and to carry out a color correction based on these points. The outputs of the computer 31 are connected to the amplifier 18, and the computer 31 adjusts the three color channels of the amplifier 18 in such a manner that each point of the master 2 actually representing skin is reproduced on the copy material 22 with a true skin tone.

The CRT 20 contains a grid 20*a* which determines the brightness of the red, green and blue signals on the screen of the CRT 20. The image formed on the screen is focused by an objective 21 on the portion of the copy material 22 which extends between the reels 23 and 24.

Instead of a single grid 20*a*, the CRT 20 may be provided with a discrete grid for each of the primary colors red, green and blue. It is also possible to replace the CRT 20 with a laser or other suitable source of radiation.

Three additive filters 25, 26, 27 colored red, green and blue are disposed between the CRT 20 and the objective 21. The filters 25,26,27 are movable into and out of the path of radiation issuing from the CRT 20 by respective electromagnets 28, 39, 30.

The mode of operation of the apparatus of FIG. 1 is as follows:

The objective lens 7 and the scanning unit 8 image the exposures or image-bearing areas of the master 2 onto the photodiode array 12 of the CCD 11 line-by-line and point-by-point. The generator 10 drives the loop oscillator S with a periodicity which is large as compared with the periodicity of a video image and with the scanning cycles of the array 12.

The array 12 comprises three neighboring rows of photodiodes with the diodes of one row sensitized for the color red, the diodes of another row sensitized for the color green, and the doides of the third row sensitized for the color blue. The outputs R,G,B receive the respective signals from the shift register 13 and transmit such signals to the corresponding inputs of the memory 15.

The illustrated CCD can be replaced by a simplified device which has a single row of photodiodes and operates with three movable color filters. Here, three sets of signals for each line of an image-bearing area of the master 2 are transmitted to the memory 15 seriatim.

Processing of the signals in the memory 15 is preferably delayed until the red, green and blue signals from each image-bearing area of the master 2 have been stored in the memory 15.

The inverter 16, if present, inverts positive signals into negative signals. Whether or not the inverter 16 is incorporated in the apparatus, the crispening circuit 17 receives negative signals which the crispening circuit 17 modifies in the manner described above. The negative signals transmitted by the outputs of the crispening circuit 17 are amplified by the amplifier 18. The amplification is controlled by the computer 31 on the basis of those points of the master 2 which are identified as actually representing skin.

The signals issuing from the amplifier 18 are modified by the gamma adjustment circuit 19 so as to conform to the characteristics of the CRT 20 and to the sensitivity of the copy material 22. The modified signals transmitted by the gamma adjustment unit 19 are used in conjunction with the color filters 25, 26,27 to successively form negative red, green and blue images of an image-bearing area of the master 2 on the copy material 22. Thus, the electromagnet 28 is actuated to move the red filter 25 into the path of radiation issuing from the CRT 20, and the grid 20*a* is simultaneously activated in accordance with the modified red signals from the gamma adjustment unit 19. This causes the red image to be formed on the portion of the copy material 22 between the reels 23, 24. The red filter 25 is thereupon replaced by the green filter 26 so that the green image is produced on the same portion of the copy material 22. The blue image is then generated on this portion of the copy material 22 by replacing the green filter 26 with the blue filter 27. The completed image consisting of the superimposed red, green and blue images is stored on the takeup reel 24 in response to advancement of an unexposed portion of the copy material 22 to a position between the reels 23, 24.

As indicated previously, the computer 31 is programmed to identify those points of the master 2 which actually represent skin or flesh. The operations performed by the computer 31 are described below.

Figure 2:
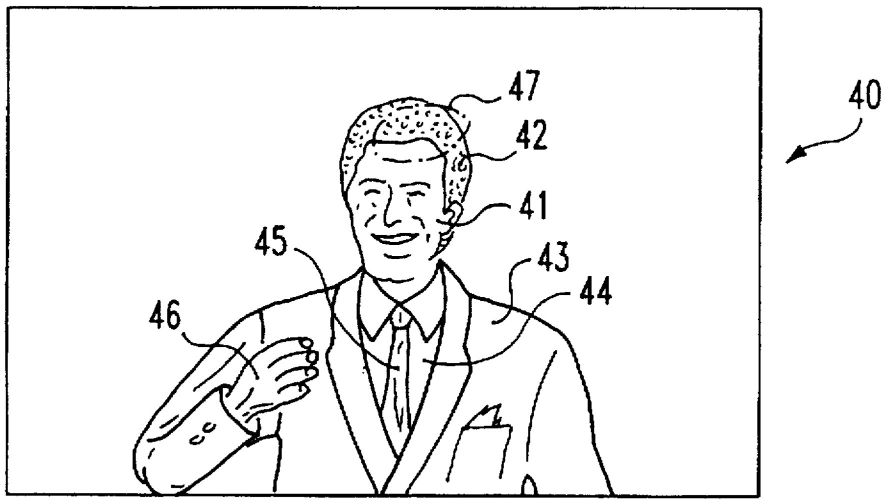
FIG. 2 schematically illustrates an image-bearing area of a color master, the image-bearing area containing an image of a person.

Referring to FIG. 2, an image-bearing area or exposure 40 of the color master 2 is shown. The image-bearing area 40 contains a portrait-like image of a person, and the image is to be copied or printed on the color copy material 22.

The face of the person, which is identified by the reference numeral 41, is located approximately in the middle of the image-bearing area 40 and is about 1/25 the size of this area. The face 41, which has a skin or flesh tone and constitutes one zone of the image, is surrounded by hair 42. The hair 42 forms an additional zone of the image and has a color differing markedly from the color of skin. The person is wearing a jacket 43, a bright shirt 44 which again constitutes an additional zone of the image, and a tie 45. The jacket 43 has a V-shaped opening and the tie 45 is visible in the opening. The right arm of the person is visible up to the right hand 46 which, like the face 41, exhibits a skin or flesh tone.

Figure 3:
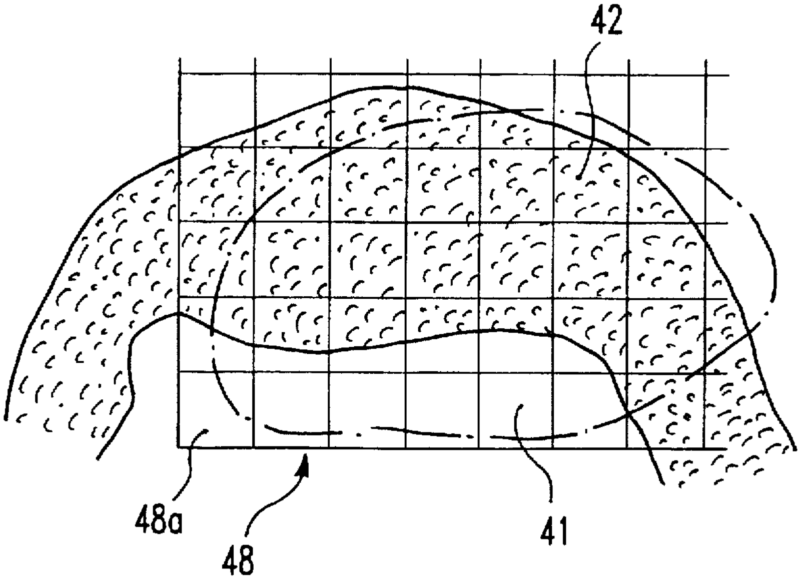
FIG. 3 is an enlarged view of a portion of the image with a superimposed grid.

In the region of the hairline at the forehead, a section 47 of the head is delimited by a dash-and-dot line. An enlarged view of the section 47 is illustrated in FIG. 3 where the hairline constituting the common boundary of the face or skin zone 41 and the hair or hair zone 42 is represented as a continuous boundary line.

A pattern 48 of square boxes 48*a* is superimposed on the section 47 and the boundary line. The boxes 48*a* represent the measurement domains of the photoelectric scanning unit 8. The scanning unit 8 photoelectrically scans the image-bearing area 40 at a multiplicity of points, and the CCD 11 generates density data for every scanned point, in each of the primary colors red, green and blue.

It will be observed that the hairline runs through the second-from-bottom row of measurement domains 48a. Depending upon the position of the hairline separating the skin zone 41 and the hair zone 42, the density values associated with these domains 48a differ and constitute mixed or composite values which lie between the density value of the skin zone 41 and the density value of the hair zone 42.

Certain of the points of the image-bearing area 40 scanned by the scanning unit 8 have color compositions characteristic of skin or flesh tones. Such points will be referred to herein as scanned characteristic points or selected points. The color compositions of the scanned characteristic points are used to generate a relatively large color space characteristic of skin or flesh tones. At least some of the composite values fall in this relatively large skin tone color space.

The nature of the skin tone color space is unimportant. Thus, the skin tone color space can be a three-dimensional space plotted on a Cartesian coordinate system having three orthogonal axes respectively representing red density, green density and blue density. A skin tone color space of this type is illustrated in U.S. Pat. Nos. 4,120,581 and 4,203,671.

Figure 4:
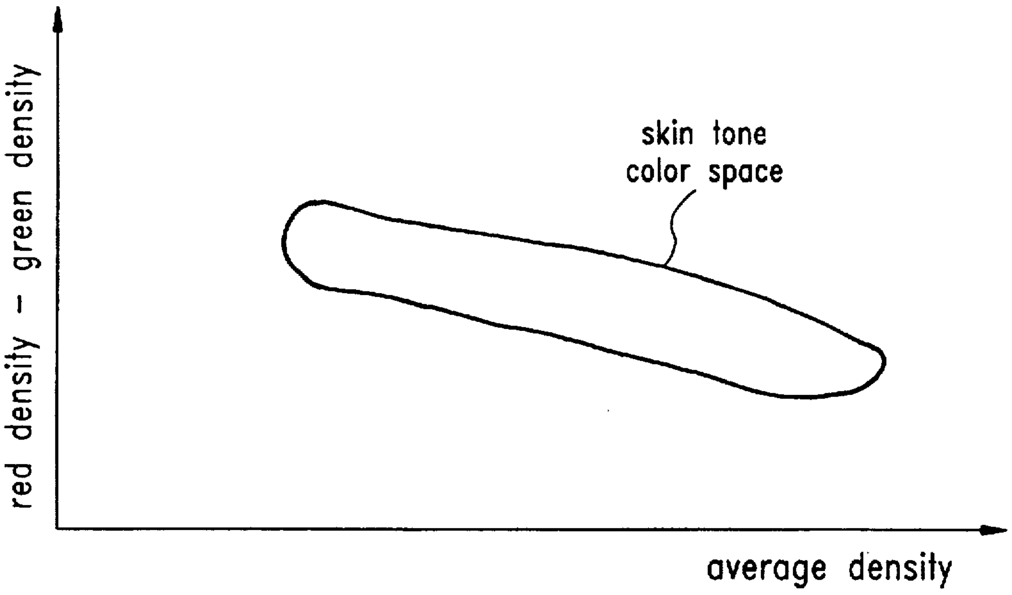
FIG. 4 shows a skin tone color space on a plot of red density minus green density verses average density.

Alternatively, the skin tone color space may be a two-dimensional space plotted on a Cartesian coordinate system having two orthogonal axes which respectively represent color density difference and average or grey density. Such a skin tone color space is shown in FIG. 4 where red density minus green density is plotted as a function of average density.

The amounts of copy light for reproducing the image-bearing area 40 on the color copy material 22 are calculated based on the skin tone color space. For optimum results, only those values or points of the color space which actually correspond to skin zones should be used in the calculations. An important aim of the invention is to more reliably identify such true skin tone values or points.

To begin with, positional relationships are determined between different scanned characteristic points of the image-bearing area 40. Thus, the position of each scanned characteristic point is individually compared with the position of every other scanned characteristic point.

The only points of the skin tone color space initially recognized as true skin tone points are those associated with domains 48*a* which, in turn, are surrounded by domains 48*a* whose values fall in the skin tone color space. In other words, only the points of the skin tone color space associated with the domains 48*a* of the lowermost row, which row is spaced from the hairline and lies entirely in the skin zone 41, are initially recognized as true skin tone points. This means that a predetermined one of the scanned characteristic points of the image-bearing area 40 is accepted as a skin point actually representing skin only when the predetermined scanned characteristic point and at least one additional scanned characteristic point are adjacent one another.

When predetermined scanned characteristic points form a group, the points of the group are accepted as skin points actually representing skin if each point of the group is adjacent at least one other point of the group. This is the case for the scanned characteristic points corresponding to the domains 48*a* of the lowermost row.

Following the acceptance of scanned characteristic points as skin points based on the adjacency of the scanned characteristic points, a comparison is made between domains 48*a* whose values are all in the skin tone color space and adjoining domains 48*a* having some values inside and some values outside of the skin tone color space. Thus, in the illustrated example, the domains 48*a* of the lowermost row, which lie entirely in the skin zone 41, are compared with the domains 48*a* which are located in the second-from-bottom row and are traversed by the hairline. To this end, a first density value is assigned to a first scanned characteristic point which corresponds to a domain 48*a* of the second-from-bottom row and lies in the region of the hairline. A second density value is assigned to a second scanned characteristic point which is located on a side of the first scanned characteristic point remote from the hairline and corresponds to a domain 48*a* of the lowermost row. This allows a density difference to be obtained between the first and second scanned characteristic points, and hence between the associated domains 48*a* of the lowermost and second-from-bottom rows.

Furthermore, a comparison is made between domains 48*a* whose values are all outside of the skin tone color space and adjoining domains 48*a* having some values inside and some values outside of the skin tone color space. In the present case, the domains 48*a* of the third-from-bottom row, which are located entirely in the hair zone 42, are compared with the domains 48a which belong to the second-from-bottom row and are traversed by the hairline. The comparison is carried out by assigning a third density value to a preselected scanned point associated with a domain 48*a* of the third-from-bottom row. This enables a density difference to be established between the preselected scanned point and the first characteristic scanned point, and accordingly between the corresponding domains 48*a* of the second-from-bottom and third-from-bottom rows.

The comparisons between the domains 48*a* of the lowermost, second-from-bottom and third-from-bottom rows yield two-stage density differences between the pure skin zone 41 and the pure hair zone 42. Subtraction involving the two-stage density differences makes it possible to determine the extent to which the values for the intermediate composite zone represented by the second-from-bottom row need be corrected or adjusted to arrive at values for skin tones. In this way, an increased number of skin points can be detected, even with relatively coarse division of the surface being scanned, without identifying points of the skin tone color space which do not represent skin as skin points. Points of the skin tone color space which do not represent skin points would falsify the results if used in calculation of the amounts of copy light.

Experience has shown that skin zones which are significant for an image only very rarely extend to the border of an image-bearing area. Accordingly, points of the skin tone color space corresponding to scanned characteristic points of the image-bearing area 40 which are clearly spaced from the border have a higher probability of being true skin tone points. A corresponding probability factor is applied to the values of such points of the skin tone color space. A predetermined one of the scanned characteristic points is then accepted as a skin point when the predetermined scanned characteristic point is spaced from the border of the image-bearing area 40.

Experience has further shown that, in photographs of festive occasions such as weddings, very brightly illuminated and mostly white articles of clothing like wedding dresses or shirts are present in the vicinity of skin zones and are illuminated with the same intensity as faces. Due to the differing reflectivities, the densities of the skin zones are mostly of the order of 0.4 to 0.6 density steps below the densities of the zones with white, illuminated clothing. In contrast, a density difference of up to 0.8 density steps can exist between a skin zone and an additional zone which includes a background of great brightness extending to the border of an image-bearing area. An example of a background of this type is a self-luminous background such as the sky.

These known density differences between skin zones and bright articles of clothing lying in the interior of an image-bearing area, or between skin zones and bright backgrounds extending to the border of an image-bearing area, allow reliable detection of skin zones to be achieved. Hence, a predetermined one of the scanned characteristic points is accepted as a skin point when the predetermined scanned characteristic point has a density which is about 0.4 to about 0.6 density steps below the density of a bright and white item of clothing. Similarly, a preselected one of the scanned characteristic points is accepted as a skin point when the preselected characteristic point has a density of up to about 0.8 density steps below the density of a bright background extending from the border of the image-bearing area 40.

Other criteria for the reliable detection of skin zones are based on an analysis of the positions of scanned characteristic points of a master or film. The object of this analysis is to detect at least a few faces of relatively small size on the master. On the basis of the positively identified skin points and the very good assumption that, when making portraits, the color temperature of the illumination is constant, the entire master can be investigated for a second time using a constricted skin tone color space.

Criteria for the reliable detection of faces include, by way of example, the existence of one or more groups of scanned characteristic points which, like a face, have approximately equal height and width. Thus, predetermined ones of the scanned characteristic points are accepted as skin points when the predetermined scanned characteristic points form a two-dimensional group of adjacent points and the number of points along each of two orthogonal directions is at least approximately the same. Furthermore, experience has shown that the brightness of a face varies because the positions of different portions of the face relative to the light source differ. Therefore, when the scanned characteristic points of a face-like group have the same color composition, the density values of adjacent points should differ by no less than 0.2 and may differ by as much as 0.5. In other words, predetermined ones of the scanned characteristic points are accepted as skin points when the predetermined scanned characteristic points are adjacent one another and have a density difference of 0.2 to 0.5.

In a given master, groups of points as above, i.e., groups of scanned characteristic points representing a face, preferably are associated with a certain minimum number of image-bearing areas or exposures. Thus, if an image-bearing area of a master contains a group of scanned characteristic points which represent a face, these scanned characteristic points are accepted as skin points when another image-bearing area of the master comprises an additional similar group of scanned characteristic points. Within a particular master, the differences between the average density values of such groups should not exceed a predetermined maximum value.

When, for a given master, there are sufficient scanned characteristic points which satisfy the foregoing additional criteria and thus have a high probability of being skin points, an average skin tone is calculated on the basis of, and over the density intervals corresponding to, the points accepted as skin points. The resulting data are plotted so as to obtain a skin tone color density difference curve for the skin points. This skin tone color density difference curve in essence constitutes the central axis of a properly positioned skin tone color space for the master. Accordingly, such a properly positioned skin tone color space can be derived, within acceptable tolerances, from the skin tone color density difference curve. It then becomes possible, with a higher probability than before and without satisfying additional criteria, to identify all those points of the master which are skin points. This allows a substantially increased point count to be obtained thereby enabling the desired red, green and blue densities of a copy or print to be achieved with the required precision.

From the viewpoint of color, the skin tone color density difference curve derived from skin points has a relatively close, known relationship ("skin offset") to a grey color density difference curve specific to an individual master. The grey color density difference curve can thus be constructed from the skin tone color density difference curve. This establishes a better basis for both density and color logic.

The principles involved in the construction and application of color density difference curves are described, for example, in U.S. Pat. No. 4,279,502.

Empirical values exist for the density differences between specific, frequently recurring image components. These empirical values likewise permit skin zones to be identified with a higher degree of reliability based on the positions of the respective zones within a master.

Figure 5:
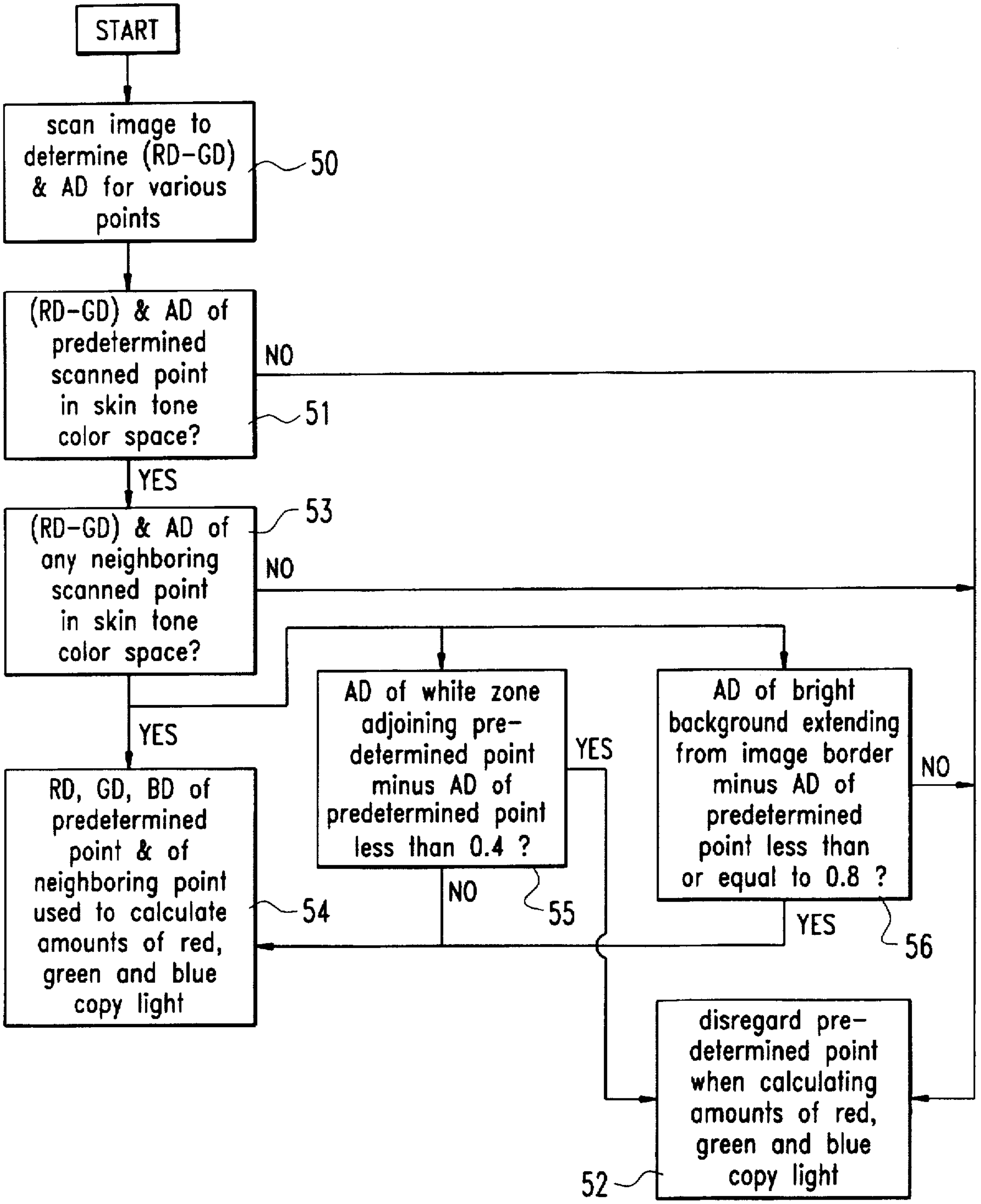
FIG. 5 is a flow chart illustrating steps in a method according to the invention.

An exemplary algorithm setting forth steps in the method of the invention is shown in FIG. 5 where RD represents red density, GD green density, BD blue density and AD average density.

Per block 50 of FIG. 5, the image of the image-bearing area 40 is scanned point-by-point and a value of red density minus green density, as well as a value of average density, is calculated for each scanned point. In accordance with block 51, the resulting pairs of density values are plotted on the coordinate system of FIG. 4 to determine whether the values lie in the skin tone color space. If the plotted density values for a predetermined scanned point are not located in the skin tone color space, the point is not a skin point and block 52 indicates that this point is disregarded in the calculation of the amounts of red, green and blue copy light. On the other hand, if the plotted density values for the predetermined scanned point lie in the skin tone color space, then the plotted density values of neighboring scanned points are examined to determine whether or not these are likewise in the skin tone color space. This is shown in block 53.

Should none of the neighboring scanned points have plotted density values within the skin tone color space, the predetermined scanned point is not a skin point. Per block 52, the predetermined scanned point is thus disregarded in the calculation of the amounts of red, green and blue copy light. On the other hand, if the plotted density values for any neighboring scanned point fall in the skin tone color space, both the predetermined scanned point and the neighboring scanned point may be accepted as skin points. Block 54 indicates that the red densities, green densities and blue densities of the two points are then used in calculating the amounts of red, green and blue copy light. However, depending upon the image and the location of the predetermined scanned point, it may be desirable to subject the predetermined scanned point and/or the neighboring scanned point to a further check. Two examples of such a further check are illustrated in blocks 55 and 56.

Per block 55, the image has a white zone adjoining the predetermined scanned point and/or the neighboring scanned point and the average density of the predetermined scanned point and/or the neighboring scanned point is subtracted from the average density of the white zone. The predetermined scanned point and/or the neighboring scanned point is affirmed to be a skin point only if the difference is equal to or greater than 0.4.

In accordance with block 56, the image has a bright background which extends from the border of the image and the average density of the predetermined scanned point and/or the neighboring scanned point is subtracted from the average density of the background. Here, the predetermined scanned point and/or the neighboring scanned point is affirmed to be a skin point when the difference is less than or equal to 0.8 but not otherwise.

The red, green and blue densities of scanned points which are not accepted as skin points can be used in calculating an average density for the entire image-bearing area 40.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A method of making a copy of an image-bearing area of a color master, said image-bearing area having at least one zone representing skin, and said method comprising the steps of scanning said image-bearing area at a plurality of points in each of a plurality of colors; evaluating the color compositions of the scanned points to identify selected points of said image-bearing area having predetermined color compositions characteristic of skin tones; determining positional relationships between different ones of said selected points of said image-bearing area; accepting one selected point of said image-bearing area as a skin point actually representing skin only when said one selected point, and at least one additional selected point, of said image-bearing area are adjacent one another; calculating an amount of copy light for said image-bearing area using data for said skin point; and making a copy of said image-bearing area on copy material using the calculated amount of copy light, the scanning step being performed using scanner means, and the evaluating, determining, accepting and calculating steps being performed using computer means.

2. The method of claim 1, wherein predetermined ones of said selected points are accepted as skin points actually representing skin when said predetermined selected points form a group such that each point of said group is adjacent at least one other point of said group.

3. The method of claim 1, wherein the scanning step is performed photoelectrically.

4. The method of claim 1, wherein said colors include red, green and blue.

5. The method of claim 1, wherein said image-bearing area has a border and a predetermined one of said selected points is accepted as a skin point actually representing skin when said predetermined selected point is spaced from said border.

6. The method of claim 1, wherein said image-bearing area includes an additional zone which adjoins said one zone and represents a white item having a predetermined density, a predetermined one of said selected points being accepted as a skin point actually representing skin when said predetermined selected point has a density which is about 0.4 to about 0.6 density steps below said predetermined density.

7. The method of claim 6, wherein said additional zone represents a brightly illuminated, white article of clothing.

8. The method of claim 1, wherein said image-bearing area includes an additional zone representing an illuminated background having a predetermined density, a predetermined one of said selected points being accepted as a skin point actually representing skin when said predetermined selected point has a density of up to about 0.8 density steps below said predetermined density.

9. The method of claim 8, wherein said additional zone represents a self-luminous background.

10. The method of claim 8, wherein said image-bearing area has a border and said background extends from said border.

11. The method of claim 1, wherein said image-bearing area includes an additional zone which represents other than skin and has a common boundary with said one zone, said one zone including a first selected point in the region of said boundary and a second selected point on a side of said first selected point remote from said boundary, said additional zone including another point; and further comprising the steps of assigning a first value to said first selected point, assigning a second value to said second selected point, assigning a third value to said other point, and adjusting said first value on the basis of said second and third values.

12. The method of claim 11, wherein the adjusting step comprises performing subtraction using said second and third values.

13. The method of claim 1, wherein predetermined ones of said selected points are accepted as skin points actually representing skin when said predetermined points form a two-dimensional group of adjacent points and the number of points along two substantially orthogonal directions is at least approximately the same.

14. The method of claim 1, wherein predetermined ones of said selected points are accepted as skin points actually representing skin when said predetermined points are adjacent one another and have a density difference greater than zero.

15. The method of claim 14, wherein said density difference is a minimum of about 0.2.

16. The method of claim 15, wherein said density difference is a maximum of about 0.5.

17. The method of claim 1, wherein predetermined ones of said selected points form at least one group of adjacent points characteristic of an anatomical feature, the points of said one group being accepted as skin points actually representing skin when said master comprises at least one additional group similar to said one group.

18. The method of claim 17, wherein said anatomical feature is a face.

19. The method of claim 17, wherein said master comprises an additional image-bearing area and said one additional group is located in said additional image-bearing area.

20. The method of claim 1, wherein predetermined ones of said selected points form at least one group of adjacent points characteristic of an anatomical feature and said master comprises an additional group similar to said one group, the points of said one group having a first average density and the points of said additional group having a second average density, the points of said one group being accepted as skin points actually representing skin when the difference between said first and second average densities is less than a predetermined value.

21. The method of claim 1, wherein the determining step comprises individually comparing the position of each of a first plurality of said selected points with the respective positions of each of a second plurality of said selected points.

* * * * *